US011713043B2

(12) United States Patent
Sullivan et al.

(10) Patent No.: US 11,713,043 B2
(45) Date of Patent: Aug. 1, 2023

(54) ALL-WHEEL DRIVE ELECTRIC VEHICLE WITH SIMULATED AXLE LOCK

(71) Applicant: FORD GLOBAL TECHNOLOGIES, LLC, Dearborn, MI (US)

(72) Inventors: Jonathan Sullivan, Ferndale, MI (US); Jose Velazquez Alcantar, Canton, MI (US); Michael Glenn Fodor, Dearborn, MI (US); Joseph Jay Torres, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 17/130,061

(22) Filed: Dec. 22, 2020

(65) Prior Publication Data

US 2022/0194378 A1 Jun. 23, 2022

(51) Int. Cl.
*B60W 30/188* (2012.01)
*B60W 10/08* (2006.01)
*B60L 15/20* (2006.01)
*B60K 7/00* (2006.01)
*B60L 50/60* (2019.01)

(52) U.S. Cl.
CPC ......... *B60W 30/188* (2013.01); *B60K 7/0007* (2013.01); *B60L 15/20* (2013.01); *B60W 10/08* (2013.01); *B60K 2007/0092* (2013.01); *B60L 50/60* (2019.02); *B60W 2510/081* (2013.01); *B60W 2710/083* (2013.01)

(58) Field of Classification Search
CPC ............... B60W 30/188; B60W 10/08; B60W 2510/081; B60W 2710/083; B60K 7/0007; B60K 2007/0092; B60L 15/20; B60L 50/60; B60L 2240/421; B60L 2240/423; B60L 2240/461; B60L 2260/28
See application file for complete search history.

(56) References Cited

U.S. PATENT DOCUMENTS

| 7,742,852 | B1 * | 6/2010 | Tang ....................... B60T 8/175 701/22 |
| 10,017,170 | B1 | 7/2018 | Morris |
| 11,584,352 | B2 * | 2/2023 | Velazquez Alcantar ..................... B60W 20/10 |
| 2018/0339698 | A1 * | 11/2018 | Höck .................... B60W 10/08 |
| 2020/0070809 | A1 | 3/2020 | Alcantar et al. |
| 2021/0078581 | A1 * | 3/2021 | Velazquez Alcantar ..................... B60L 3/10 |
| 2021/0155219 | A1 * | 5/2021 | Alcantar ............... B60W 10/08 |
| 2021/0376627 | A1 * | 12/2021 | Sato ........................ H02J 1/001 |

FOREIGN PATENT DOCUMENTS

| JP | 2006187049 A | | 7/2006 | |
| KR | 101146943 B1 | * | 5/2012 | .............. B60L 15/20 |

* cited by examiner

*Primary Examiner* — Tisha D Lewis
(74) *Attorney, Agent, or Firm* — David B Kelley; Brooks Kushman P.C.

(57) ABSTRACT

A vehicle includes a first axle having a first electric machine, a second axle having a second electric machine and a controller. The controller is programmed to, in a user-selected four-wheel drive mode, command a first torque to the first electric machine based on a driver-demanded torque and a speed of the second axle, and command a second torque to the second electric machine based on a comparison of the driver-demanded torque and the first torque and further based on a speed of the first axle.

17 Claims, 4 Drawing Sheets

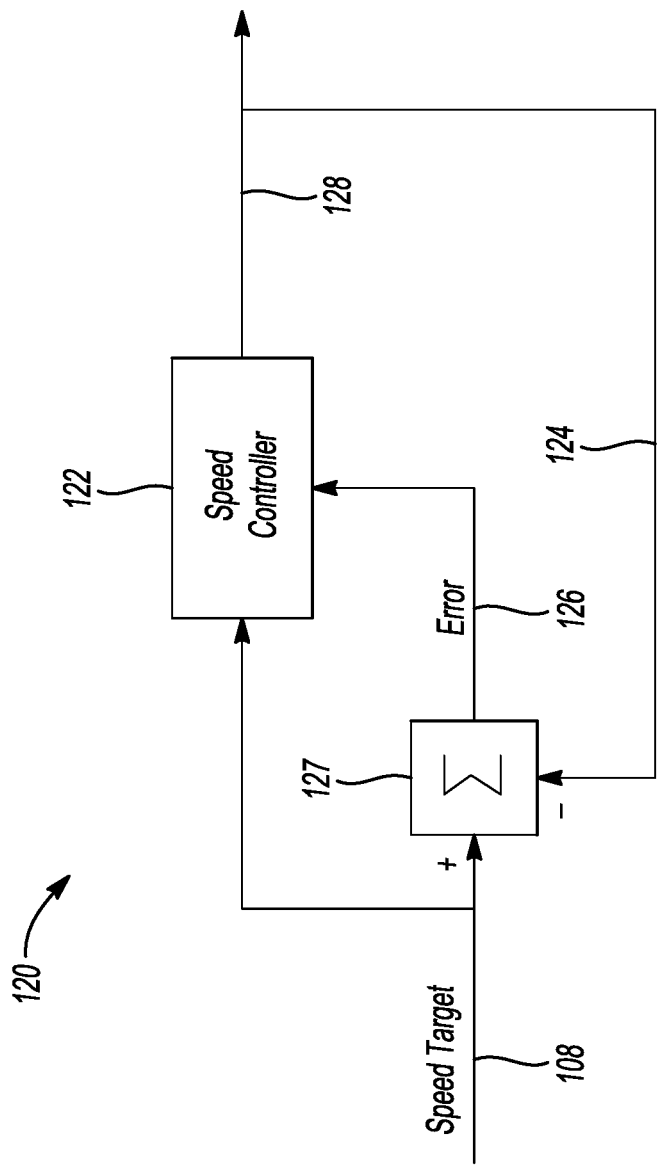

ALL-WHEEL DRIVE ELECTRIC VEHICLE WITH SIMULATED AXLE LOCK

TECHNICAL FIELD

The present disclosure relates to all-wheel-drive electric vehicles and more specifically to a user-selected mode in which the separate electric axles of the vehicle are operated to simulate a mechanical connection therebetween.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power. Hybrid electric vehicles additionally include an engine. An all-wheel-drive electric vehicle may include front and rear electric axles independently powered by dedicated electric machines.

SUMMARY

According to one embodiment, a vehicle includes a first axle have a first electric machine, a second axle having a second electric machine and a controller. The controller is programmed to, in a user-selected four-wheel drive mode, command a first torque to the first electric machine based on a driver-demanded torque and a speed of the second axle, and command a second torque to the second electric machine based on a comparison of the driver-demanded torque and the first torque and further based on a speed of the first axle.

According to a further embodiment, a system of operating a four-wheel drive vehicle includes a controller. The controller is programmed to, in a user-selected four-wheel drive mode, command a first torque to a first electric machine based on a driver-demanded torque and a speed of a second axle, and command a second torque to a second electric machine based on a comparison of the driver-demanded torque and the first torque and further based on a speed of the first axle.

According to another embodiment, a vehicle includes a first axle having a first electric machine configured to power first wheels and a second axle having a second electric machine configured to power second wheels. A controller is programmed to, responsive to a user-selected four-wheel drive mode being activated. command a first torque to the first electric machine having a torque-control component based on a driver-demanded torque and a speed-control component based on an average speed of the second wheels, and command a second torque to the second electric machine having a torque-control component based on a difference between the driver-demanded torque and the torque-control component of the first electric machine and a speed-control component based on an average speed of the first wheels.

According to yet another embodiment, a method of operating of an electric vehicle in a user-selected four-wheel drive mode includes commanding a first torque to a first axle equal to a summation of (i) a first torque-control component that is based on an accelerator pedal position and (ii) a first speed-control component that is based on an error between a target speed for the first axle, which is derived from a speed of a second axle, and a measured speed of the first axle; and commanding a second torque to the second axle equal to a summation of (i) a second torque-control component that is based on the accelerator pedal position and the first torque control component and (ii) a second speed-control component that is based on an error between a target speed for the second axle, which is derived from the speed of the first axle, and a measured speed of the second axle.

BRIEF DESCRIPTION OF THE DRAWINGS

FIG. 4 is a schematic diagram of a speed controller of the controls of FIG. 2.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
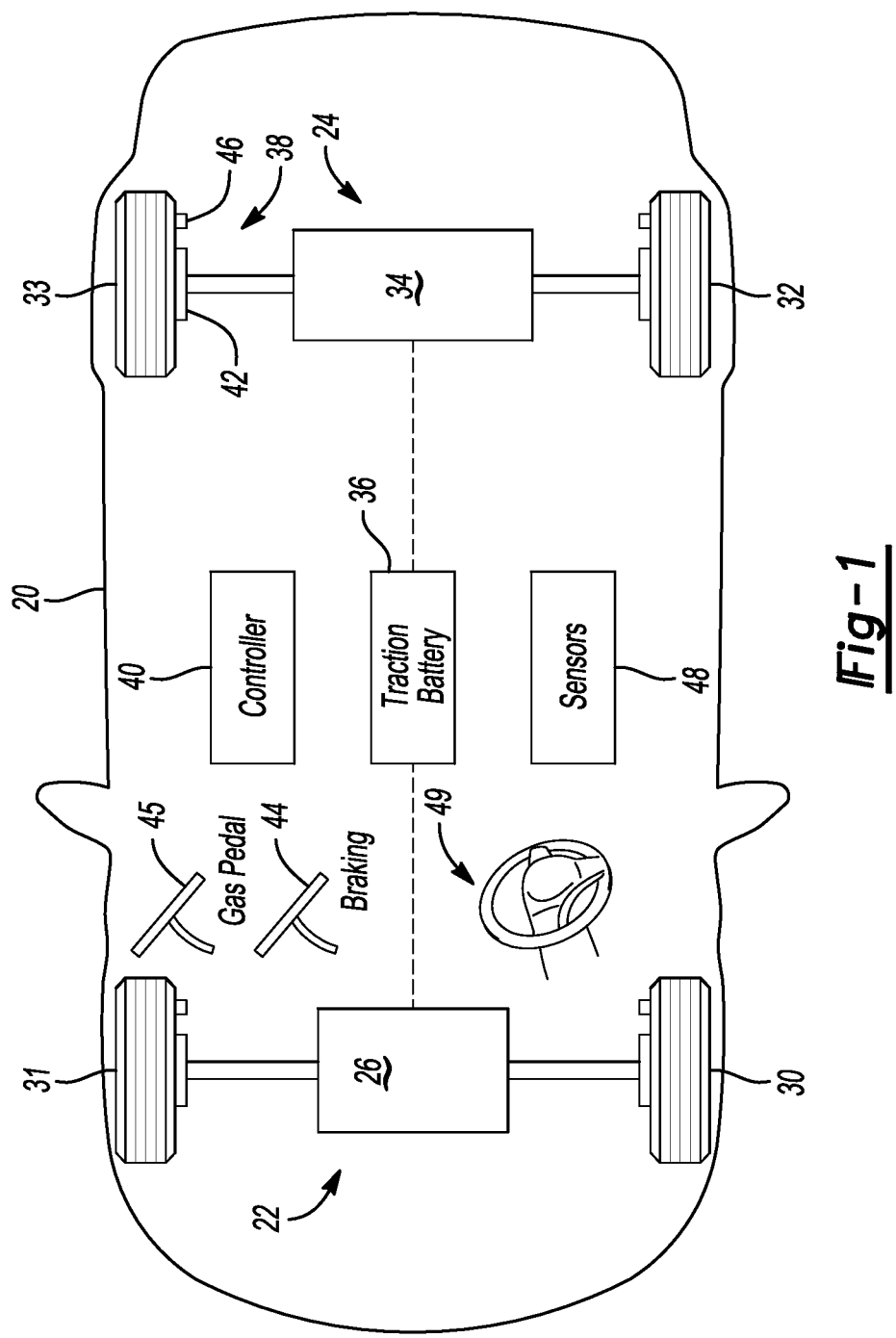
FIG. 1 is a schematic diagram of an all-wheel-drive electric vehicle.

Referring to FIG. 1, an electrified vehicle 20 is illustrated as a fully electric vehicle but, in other embodiments, the electrified vehicle 20 may be a hybrid-electric vehicle that includes an internal-combustion engine. The vehicle 20 has electric all-wheel drive (AWD). The vehicle 20 may include a primary drive axle 24 and a secondary drive axle 22, which may be referred to as electric axles. In the illustrated embodiment, the primary drive axle 24 is the rear axle and the secondary drive axle 22 is the front axle. In other embodiments, the front axle may be the primary drive and the rear axle may be the secondary drive. The primary and secondary axles may include their own powerplant, e.g., an electric machine, and are capable of operating independently of each other or in tandem to accelerate (propel) or brake the vehicle 20.

The secondary drive axle 22 may include at least one powerplant, e.g., electric machine 28, operable to power the secondary wheels 30 and 31. A gearbox (not shown) may be included to change a speed ratio between the wheels 30, 31 and the powerplant(s). The primary drive axle 24 may include at least one powerplant, e.g., an electric machine 34, that is operably coupled to the primary wheels 32 and 33. A gearbox (not shown) may be included change a speed ratio between the powerplant(s) 34 and the wheels 32, 33. While not illustrated, the vehicle 20 could also include four electric machines each mounted to one of the wheels.

The electric machines 28, 34 are capable of acting as motors to propel the vehicle 20 and are capable of acting as generators to brake the vehicle 20 via regenerative braking. The electric machines 28, 34 may be permanent magnet synchronous alternating current (AC) electric motors or other suitable type.

The electric machines 28, 34 are powered by one or more traction batteries, such as traction battery 36. The traction battery 36 stores energy that can be used by the electric machines 28, 34. The traction battery 36 provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 36 may be electrically connected to one or more power-electronics modules through one or more contactors. The module may be electrically connected to the electric machines 28, 34 and may provide the ability to bi-directionally transfer electrical energy between the traction battery 36 and the electric machines 28, 34. For example, the traction battery 36 may provide a DC voltage while the electric machines 28, 34 may require a three-phase AC voltage to function. The power-electronics module may convert the DC voltage to a three-phase AC voltage as required by the electric machines. In a regenerative mode, the power-electronics module may convert the three-phase AC voltage from the electric machines 28, 34 acting as generators to the DC voltage required by the traction battery 36.

The vehicle 20 includes a controller 40 in electric communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data, and are stored within the memory. The controller 40 may communicate with other vehicle systems and controllers over one or more wired or wireless vehicle connections using common bus protocols (e.g., CAN and LIN). Used herein, any reference to "a controller" refers to one or more controllers. The controller 40 may include battery energy control module (BECM) that operates at least the traction battery, a powertrain control module (PCM) that operates at least the electric machines, and an ABS control module that controls the anti-lock braking system (ABS) 38.

The ABS 38 may be a hydraulic system, an electric system. or a combination of electronic and a hydraulic. The ABS 38 may include a brake module and a plurality of friction brakes 42 located at each of the wheels. Modern vehicles typically have disc brakes; however, other types of friction brakes are available, such as drum brakes. Each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS system 38 also includes associated wheel-speed sensors 46 each located at one of the wheels. Each sensor 46 is configured to output a wheel-speed signal to the controller 40 indicative of a measured wheel speed.

The vehicle 20 is configured to slow down using regenerative braking, friction braking, or a combination thereof. The controller 40 includes programming for aggregating a demanded braking torque between regenerative braking, i.e., the electric machines, and the friction brakes 42. The demanded braking torque may be based on driver input, e.g., a position of the brake pedal 44, or by the controller 40. The aggregator of the controller 40 may be programmed to slow the vehicle using regenerative braking whenever possible and apply the friction brakes 42 when necessary.

The vehicle 20 includes an accelerator pedal 45. The accelerator pedal 45 includes a range of travel from a released position to a fully depressed position and indeterminate positions therebetween. The accelerator pedal 45 may include an associated sensor (not shown) that senses the position of the pedal 45. The sensor is configured to output a pedal-position signal to the controller 40 that is indicative of a sensed position of the pedal 45. The accelerator pedal 45 is used by the driver to command a desired speed/acceleration of the vehicle. Under normal conditions, the accelerator pedal 45 is used by the driver to set a driver-demanded torque. The controller 40 may be programmed to receive the pedal-position signal and determine the driver-demanded torque based on pedal position, vehicle speed, and other factors.

The vehicle 20 may include one or more sensors 48 configured to determine accelerations of the vehicle. For example, the sensors 48 may include a yaw-rate sensor, a lateral-acceleration sensor, and a longitudinal-acceleration sensor. Used herein, "acceleration" refers to both positive acceleration (propulsion) and negative acceleration (braking). The yaw-rate sensor generates a yaw-rate signal corresponding to the yaw rate of the vehicle. Using the yaw rate sensor, the yaw acceleration may also be determined. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. The various sensors are in communication with the controller 40. In some embodiments, the yaw rate, lateral acceleration, longitudinal acceleration, and other measurements may be measured by a single sensor.

The vehicle 20 may also include a steering system 49 that turns the front wheels 30, 31. The steering system 49 may include a steering wheel connected to a steering shaft that actuates a steering box, such as a rack-and-pinion assembly. The steering box is operably coupled to the front wheels 30, 32 and turns the wheels according to inputs from the steering wheel. The steering system 49 may include one or more sensors configured to output a signal indicative of steering angle to the controller 40. The steering sensor may measure rotation of the steering shaft.

The electric machines 28, 34 may be operated in torque control, speed control, or a blended control. The vehicle may be configured to operate both machines in torque control, both machines in speed control, one of the machines in speed control while the other the machines in torque control, or in a blended control for one or both of the electric machines. During torque control, the controller commands a torque to the electric machine based on the driver-demanded torque. In speed control, a closed-loop feedback controller is used to control the electric machines to a target speed. The speed control controller is configured to command a torque to the electric machines based on a speed error between the measured speed and the target speed. This will be described in more detail below.

Electric all-wheel drive vehicles, e.g., vehicle 20, utilize independent propulsion devices, e.g., electric machines, at each axle enabling independent control of the torque/speed at each axle. As such, the vehicle can dynamically adjust the front-rear torque split in order to maximize traction, handling performance, and the like. One benefit of electric AWD is that the electric machines can change the torque delivery more quickly and accurately than an internal-combustion engine. As a result, the electric machines can allow for precise control of each axle. The speed of the electric machine directly reflects the average speed of the wheels on each axle. Therefore, the average wheel speed of each axle can be controlled by actively controlling the electric-machine speed at each axle.

Vehicles, like vehicle 20, that have two independent electric axles present challenges in controlling wheel speed and motor torques when a traction differential (sometimes called split mu) is present between the front and rear axles. One problem in vehicle controls is how to handle traction (mu) changes between axles that cause excessive wheel flare on one axle. Under normal conditions, the torque split is varied to each axle depending on sensed accelerations (e.g., yaw, latitudinal, longitudinal, etc.), wheel slip and other vehicle conditions. During significant changes in mu where wheel flare occurs, speed control may be used to control to a target wheel slip to achieve as much torque as is available at the contact patch. These trigger limits may be set high to not interfere with torque control and affect drivability. This problem is not present in conventional four-wheel drive as the driveshafts and transfer case provide mechanical connection between the front and rear axles. For example, in conventional 4-high mode, the mechanical connection between the front and rear axles provides a convenient handling characteristic of automatically stopping axle run away by mechanically linking the speeds of the axles so torque is always sent to the axle with traction while meeting driver-demand torque.

To provide similar feel in the vehicle 20, electric controls must be used to mimic the mechanical connections of the conventional four-wheel drive. This presents many challenges, for example, putting one axle in speed control to target ground speed tends to induce a feedback loop in the other axle, which may cause torque shuffle, poor axle torque split, and wheel flare when the axle in torque mode encounters a low-traction surface.

The vehicle 20 may include a simulated 4-high (4H) mode, which may be user selected, that mimics driving performance of a traditional four-wheel-drive vehicle via electronic controls that simulate the mechanical linkage of the traditional all-wheel drive. The simulated 4H mode is provided by running both axles in torque mode and blending in the speed controller torque on any axle that begins to exceed the other. The speed target for each axle is set as the current filtered speed of the other axle adjusted for steering wheel angle to account for differences in radius traveled during a turn. An extra speed margin may be added on top of the target for each axle to account for CAN and filter delays and to ensure that the axle is contributing to the driver-demand torque and is not just following the other axle. As one axle begins to exceed the other by a threshold speed, a blend reduces torque to the speed-control torque being currently calculated. Beyond this initial threshold lies a speed point at which the controller will be entirely in speed control mode and it will exit once torque-control torque exceeds this speed-control torque by a threshold amount. The integral gain on the speed controller may not be applied until the axle is fully in speed control. A traction adjustment feature may be added to place both axles into speed control mode when they exceed ground speed by a calibrated value and traction (mu) is below a threshold. This way the controller can avoid both axles running away from ground speed in instances where torque cannot be grounded on either axle. However, during instances where there is slip and off-road conditions where torque can be grounded, the vehicle will retain the same drivability the driver expects from torque mode. This new torque-and-speed-control mode (which may be referred to as "blended mode") will predominantly retain the feel of torque mode with the planted feel of traditional 4H but also will not incur any axle binding in turns since this adjustment is made in the software providing a significantly better experience for the customer than traditional 4H.

As introduced above, the vehicle 20 may include a user-selected mode designed to mimic the four-high mode of a traditional four-wheel-drive vehicle. For ease of description, this mode will be referred to as "four-wheel drive mode," but this label is not meant to be limiting and may be referred to by a plethora of other naming conventions such as all-wheel drive mode, off-road mode, etc. Therefore, the user-selected four-wheel drive mode includes any mode in which the primary and secondary electric axles are in full-time use to propel the vehicle. The four-wheel drive mode may be user selected through one or more human-machine interfaces (HMI) sometimes referred to an input. The HMI may be, for example, a touchscreen, a button, a switch, capacitive touch, or the like. The driver activates the four-wheel drive mode by operating the input.

Figure 2:
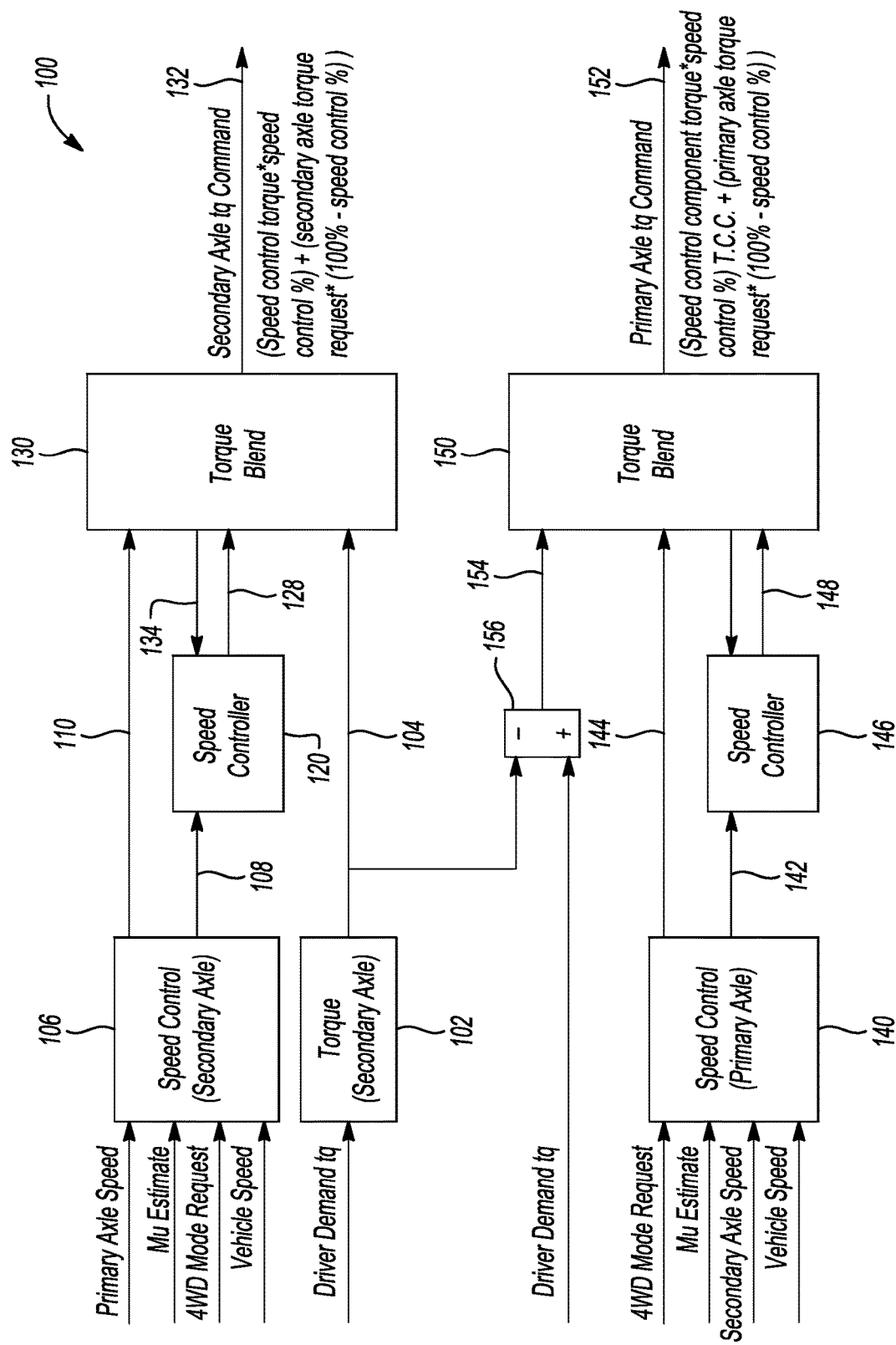
FIG. 2 is a control diagram for operating the vehicle in a user-selected mode that simulates mechanical connection between the primary and secondary electric axles.

Referring to FIG. 2, control diagram 100 illustrates controls for operating the vehicle in the four-wheel drive mode. Controls of FIG. 2 are activated in response to the driver selecting the four-wheel drive mode. The controls 100 include two mostly parallel calculations for determining the torque command to the primary axle and the torque command to the secondary axle. In this mode, the final torque commanded to each the electric machine is a blended torque having a torque-control component (torque) and a speed-control component (torque). (It is possible for either the torque-control component or the speed-control component to be zero in the final blended torque command.) The controls 100 generally calculate these two component torques separately and then blend them based on a percentage of speed control, which may be between 0 and 100 percent.

A torque-control box 102 is responsible for calculating the torque-control component for the secondary axle. Control box 102 receives the driver-demanded torque, which is indicative of the total wheel torque commanded by the driver. Torque control box 102 derives a secondary axle torque to optimize torque distribution between front and rear axles based on weight transfer associated with the longitudinal and latitudinal response of the vehicle and distributes torque as necessary to correct a yaw error. A weak feedback component may also be employed to avoid excessive overrun of an axle from ground speed to avoid departing too far from the peak of a wheel's mu curve without effecting drivability significantly. The torque-control box 102 outputs a torque-control component torque 104 for the secondary axle.

Figure 3:
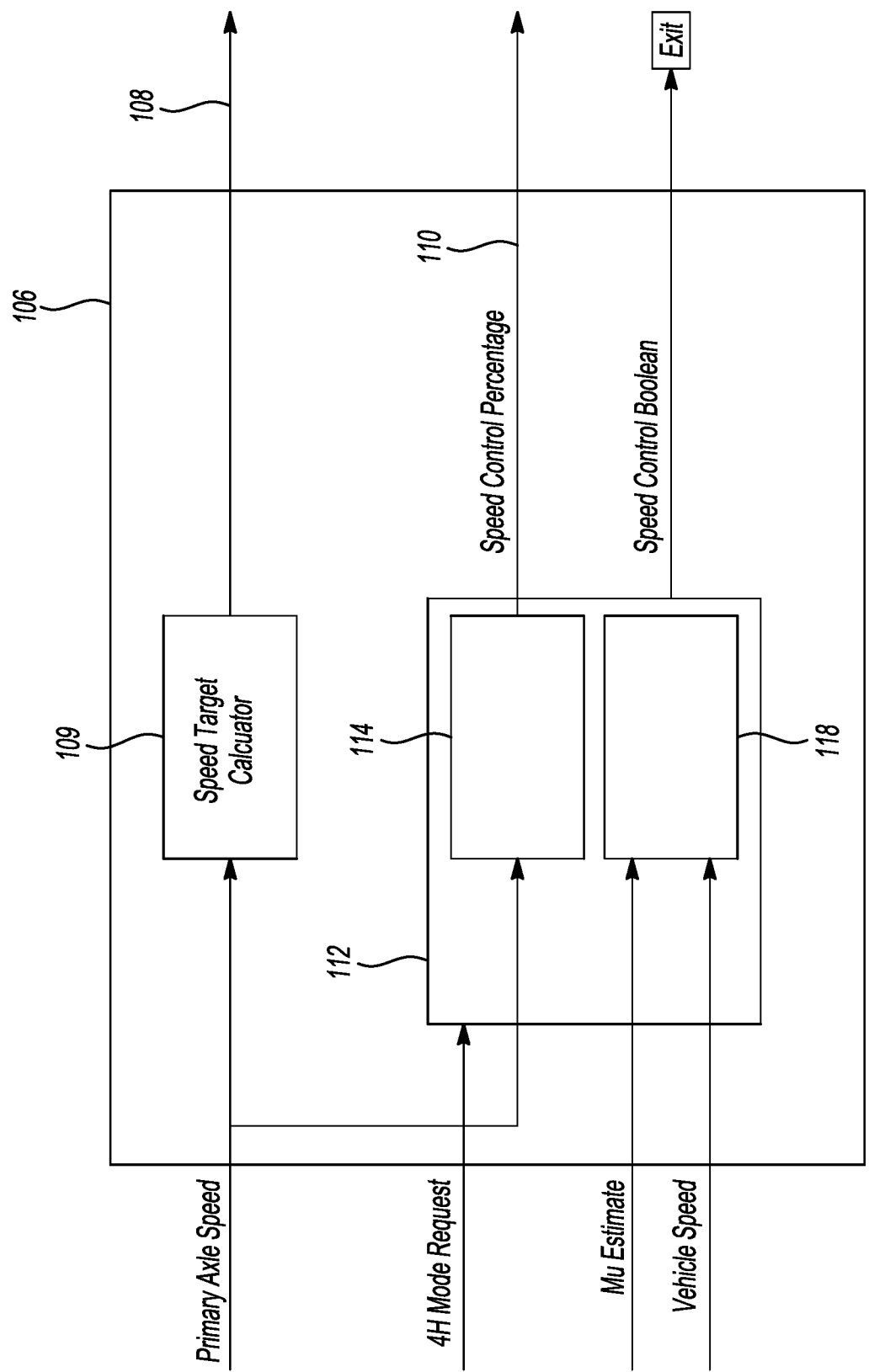
FIG. 3 is a detail view of the speed-control box of FIG. 2.

Referring to FIGS. 2 and 3, a speed control box 106 is responsible for calculating a target speed 108 and a speed-control percentage 110. The speed control box 106 receives the primary axle speed, a mu estimate, the mode request, and the vehicle speed. Within control box 106 is an operation 109 that calculates a speed target 110 for the closed-loop feedback control of the speed controller. The speed target 108 is based on the measured speed of the primary axle. The measured speed of the primary axle may be calculated by an average speed of the wheels associated with the primary axle or the resolver sensor in the motor. Operation 109 may utilize one or more lookup tables that determine a speed target for the secondary axle or motor based on the primary axle speed, a steering wheel angle, and one or more calibrated factors. Operation 112 calculates a speed-control percentage that is used later in the blending operation. The controller may calculate the speed-control percentage based on the vehicle speed, the primary axle speed, and a mu estimate of the secondary axle. Within box 112 is control logic 114 that determines the speed-control percentage 110. The control logic 114 may include one or more lookup tables used to increase or decrease the speed-control percentage based on a variety of factors such as the speed difference between the primary and secondary axles, steering wheel angle, and the like. For example, the control logic 114 may increase the speed-control percentage if the slip between the front and rear axles is high and may reduce the speed-control percentage when the slip between the front and rear axles is low. Control logic in box 118 is used to determine if this blended mode should end and to force both motors into a speed-control mode. This may be based on the mu estimate. If the mu estimate is less than a threshold, then this routine is exited, and the axles are controlled using speed control only.

Referring to FIGS. 2 and 4, a speed-control box 120 receives the speed target 108 for the secondary axle. The speed target 108 may be either a motor speed target or an axle speed target depending upon the programming. The speeds can be converted between the motor domain and the wheel domain by multiplying or dividing by the gear ratio therebetween. A speed controller 122 commands a speed-control component torque 128 for the secondary motor/axle based on the speed 108 and an error 126. A closed feedback loop is used to adjust the torque command 154 to reduce an error 126 between the measured speed 124 and the target speed 108. Measured speed 124 may be a measured wheel speed or measured motor speed depending upon the domain of the speed target 108. The target speed 108 is compared to the measured speed 124 at summation block 127 to calculate the error 126. The error 126 is provided to the speed controller 122, which includes logic for adjusting the torque commands to reduce the error. The speed controller 122 may be a PID, a PI, or other type of controller. The speed controller 122 outputs the torque command 128.

The torque blend box 130 receives the speed-control component torque 128, the speed-control percentage 110, and the torque-control component torque 104. In box 130, the controls determine a blended-torque command 132 for the secondary axle. The commanded torque 132 may be in the motor domain or in the wheel domain. If in the wheel domain, another control box converts the wheel-torque command to a motor-torque command that is then sent to the secondary motor. For example, equation 1 may be used to calculate the torque command 132: [(Speed-control component×speed-control %)+(torque-control component×(100%−speed-control %))].

Box 130 may also include integrator lockout controls that send a signal 134 back to the speed controller 120. The integrator lockout, when active, removes the integrator from the PI or PID control when the speed-control percentage is below a threshold, e.g., less than 10 percent.

The controls 100 also control the primary axle in a blended speed control and torque-control mode similar to the secondary axle described above. A speed control box 140 for the primary axle may be similar to the speed control box 106 except that the secondary axle speed is used as an input rather than the primary axle speed. The remaining inputs may be the same as control box 106. As discussed above, the control box 140 outputs a speed-control target 142 and a speed control percentage 144. The speed-control target 142 is used by a speed controller 146 that may operate as described above with regards to speak controller 120. The speed controller 146 outputs a speed-control component torque 148 to the torque blend box 150. The torque blend box 150 also receives the speed-control percentage 144 and a torque-control component torque 154. The torque 154 may be equal to the driver-demanded torque minus the secondary axle torque-control torque 104 which is calculated at box 156. Equation 1 may be used within the torque blend box 150 to determine the blended primary axle torque 152 that is commanded to the electric machine associated with the primary axle.

The above-described controls provide a user-selected mode in which the separate electric axles of the vehicle are operated to simulate a mechanical connection therebetween. This mode may provide increased performance on off-road and slipper conditions by reducing lag time for torque change in the secondary axle and reducing wheel flare.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for operating a four-wheel drive vehicle comprising:
a controller programmed to, in a user-selected four-wheel drive mode:
command a first torque to a first electric machine associated with a first axle based on a driver-demanded torque and a speed of a second axle, wherein the first torque includes a first speed-control component and a first torque-control component and
command a second torque to a second electric machine associated with a second axle based on (i) a comparison of the driver-demanded torque and the first torque and (ii) further based on a speed of the first axle, wherein the second torque includes a second speed-control component and a second torque-control component, and
increase the second speed-control component and decrease the second torque-control component in response to an increasing differential between the speeds of the first and second axles, and wherein the first speed-control component is further based on an error between a target speed for the first electric machine, which is derived from the speed of the second axle, and a measured speed of the first electric machine.

2. The system of claim 1, wherein the first speed-control component is based on the speed of the second axle.

3. The system of claim 2, wherein the second speed-control component is based on the speed of the first axle.

4. A vehicle comprising:
a first axle including a first electric machine configured to power first wheels;
a second axle including a second electric machine configured to power second wheels; and
a controller programmed to, responsive to a user-selected four-wheel drive mode being activated:
command a first torque to the first electric machine having a torque-control component based on a driver-demanded torque and a speed-control component based on an average speed of the second wheels,
command a second torque to the second electric machine having a torque-control component based on a difference between the driver-demanded torque and the torque-control component of the first electric machine and a speed-control component based on an average speed of the first wheels, and
increase the speed-control component and decrease the torque-control component of the first torque in response to a reduction in traction of the first axle.

5. The vehicle of claim 4, wherein the controller is further programmed to increase the speed-control component and decrease the torque-control component of the first torque in response to an increasing differential between the average speeds of the first and second wheels.

6. The vehicle of claim 5, wherein the controller is further programmed to increase the speed-control component and decrease the torque-control component of the second torque in response to an increasing differential between the average speeds of the first and second wheels.

7. The vehicle of claim 4, wherein the speed-control component of the first electric machine is further based on an error between a target speed for the first electric machine, which is derived from the average speed of the second wheels, and a measured speed of the first electric machine.

8. The vehicle of claim 7, wherein the speed-control component of the second electric machine is further based on an error between a target speed for the second electric machine, which is derived from the average speed of the first wheels, and a measured speed of the second electric machine.

9. The vehicle of claim 4, wherein the controller is further programmed to increase the speed-control component and decrease the torque-control component of the second torque in response to a reduction in traction of the second axle.

10. The vehicle of claim 4, wherein the speed-control components are further based on a steering angle of the vehicle.

11. The vehicle of claim 10, wherein the speed-control components of the first and second torques are further based on a speed of the vehicle.

12. A method of operating of an electric vehicle in a user-selected four-wheel drive mode, the method comprising:
commanding a first torque to a first axle equal to a summation of (i) a first torque-control component that is based on an accelerator pedal position and (ii) a first speed-control component that is based on an error between a target speed for the first axle, which is derived from a speed of a second axle, and a measured speed of the first axle; and
commanding a second torque to the second axle equal to a summation of (i) a second torque-control component that is based on the accelerator pedal position and the first torque control component and (ii) a second speed-control component that is based on an error between a target speed for the second axle, which is derived from the speed of the first axle, and a measured speed of the second axle.

13. The method of claim 12, wherein the second torque-control component is derived from a difference between a driver-demanded torque and the first torque-control component.

14. The method of claim 12, wherein the target speeds of the first and second axles are based on a steering angle of the vehicle.

15. The method of claim 12, wherein the first and second speed-control components are further based on traction between a driving surface and the first and second axles.

16. The method of claim 12 further comprising:
increasing the speed-control component and decreasing the torque-control component of the first torque in response to an increasing speed differential between the first and second axles.

17. The method of claim 12 further comprising:
increasing the speed-control component and decreasing the torque-control component of the second torque in response to an increasing speed differential between the first and second axles.

* * * * *